US005982510A

United States Patent [19]
Funahashi

[11] Patent Number: 5,982,510
[45] Date of Patent: Nov. 9, 1999

[54] INFORMATION RECORDING DEVICE WHICH SELECTS PAPER TRAY AND SHIFTS OUTPUT ACCORDING TO RECEIVED IMAGE DATA OR SOURCE

[75] Inventor: Hiroyuki Funahashi, Nagoya, Japan

[73] Assignee: Brother Kogyo Kabushiki Kaisha, Nagoya, Japan

[21] Appl. No.: 08/898,112

[22] Filed: Jul. 22, 1997

[30] Foreign Application Priority Data

Jul. 25, 1996 [JP] Japan ................................ 8-196753

[51] Int. Cl.⁶ ............................ H04N 1/32; G06F 15/00
[52] U.S. Cl. ...................... 358/468; 358/442; 395/112; 395/114
[58] Field of Search ................................. 358/400, 401, 358/402, 468, 498, 296, 405, 474, 476, 496, 434, 442; 395/101, 106, 111, 112, 114; 399/1, 16, 381, 391, 393, 397, 404, 405, 403; 271/207, 220, 298, 279, 280; 379/100.08, 93.24; 347/101, 104

[56] References Cited

U.S. PATENT DOCUMENTS 5,025,326  6/1991  Shimmyo ............................ 358/498
5,128,762  7/1992  Muramatsu et al. .................... 358/296
5,621,541  4/1997  Sakai et al. ............................ 358/498

FOREIGN PATENT DOCUMENTS

A-6-298435  10/1994  Japan.
7-149471    6/1995   Japan ............................ B65H 39/11

Primary Examiner—Edward L. Coles
Assistant Examiner—Mark Wallerson
Attorney, Agent, or Firm—Oliff & Berridge, PLC

[57] ABSTRACT

An information recording device can function as a facsimile, a copy machine and a printer. The device receives plural kinds of information to be recorded and judges the kind of the information thus received. The information received is recorded onto a paper. The device is provided with a plurality of paper trays, and a delivering unit delivers a recorded paper on which the information is recorded to one of the paper trays which is determined in accordance with the kind of the information to be recorded. Thereby, the recorded paper on which same kind of information is recorded is delivered to same one of the paper trays, and a user can easily discriminate the recorded papers of different information.

11 Claims, 6 Drawing Sheets

INFORMATION RECORDING DEVICE WHICH SELECTS PAPER TRAY AND SHIFTS OUTPUT ACCORDING TO RECEIVED IMAGE DATA OR SOURCE

BACKGROUND OF THE INVENTION

1. Field of the Invention

The present invention relates to an information recording device which records different types of information, such as facsimile information and copy information, on recording papers.

2. Description of the Prior Art

Recently, there has been developed a multi-function information recording device including a printer function, a facsimile function and a copy function. The printer function serves to record information inputted by an information processing device such as an external computer onto predetermined papers and output the recorded papers. The facsimile function serves to record information inputted via external telephone lines onto predetermined papers and output the recorded papers. The copy function serves to record information inputted from an information reading device, such as a scanner, onto predetermined papers and output the recorded papers.

In the conventional multi-function information recording device described above, the recorded papers are delivered to identical paper tray or stacker and stacked up at an identical position, even if the type of information recorded on the papers are different.

However, if the recorded papers of different types of information are delivered to the same paper tray and stacked up at the same position on the tray, the following inconvenience takes place. Namely, in such a case, recorded papers of data from a computer and data from telephone lines are stacked up at the same position of the same tray in the mixed fashion, for example. Therefore, a user who wants to take out the recorded paper of computer data may also take out the recorded papers of the telephone line data erroneously, and the recorded papers of the telephone line data may sometimes be lost. If the data sent via the telephone line is important, the loss or missing of the recorded paper may result a serious problem.

SUMMARY OF THE INVENTION

It is an object of the present invention to provide an information recording device capable of outputting recorded papers of different types of information in a clearly distinguished and noticeable manner, so as to prevent important recorded papers from being mixed and lost.

According to one aspect of the present invention, there is provided an information recording device including: a unit for receiving plural kinds of information to be recorded; a unit for judging a kind of the information received by the receiving unit; a unit for recording the information received by the receiving unit onto a paper; a plurality of paper trays; and a unit for selectively delivering a recorded paper on which the information is recorded by the recording unit to one of the plurality of paper trays on the basis of the kind of the information recorded on the recorded paper which is judged by the judging unit.

In accordance with the device thus constructed, the receiving unit receives plural kinds of information to be recorded on paper or the like. The judging unit judges the kind of the information received by the receiving unit and outputs a judgment signal based on the judgment result. The recording unit records the information received by the receiving unit onto a paper. The delivering unit delivers a recorded paper on which the information is recorded by the recording unit to one of the plurality of paper trays on the basis of the kind of the information recorded on the recorded paper. Therefore, the recorded papers are distributed to different paper trays according to the kind of the information recorded thereon, and a user can easily discriminate recorded papers of different information.

The delivering unit may selectively deliver the recorded paper to one of the plurality of paper trays on the basis of an information source from which the information recorded is derived. Further, the delivering unit may deliver the recorded paper on which the information derived from a communication means is recorded to a first one of the plurality of paper trays, and delivers the recorded paper on which the information derived from other information source is recorded to one of the plurality of paper trays other than said first one.

The delivering unit may deliver the recorded paper of different information to different positions on the paper tray which is other than the first one in accordance with a judgment signal output from the judging unit. Thereby, the recorded papers of different information maybe discriminated by the positions on the paper tray. The different positions may include positions which are shifted from each other in a direction which is normal to a delivery direction of the recorded paper.

Further, the information may include a first kind of information which is derived from a first source, a second kind of information which is derived from a second source and a third kind of information which is derived from a third source. The delivering unit may deliver the recorded paper of the first information to a first paper tray, deliver the recorded paper of the second information to a first position of a second paper tray, and deliver the recorded paper of the third information to a second position of the second paper tray, wherein the second position is different from the first position.

The first source may be a communication unit, the second source may be an information processing unit and the third unit is may be information reading unit.

According to another aspect of the present invention, there is provided an information recording device including: a receiver which receives plural kinds of information to be recorded; a recording device which records the information received by the receiver onto a paper; a plurality of paper trays; and a switching device which switches paper delivery paths from the recording device to one of the plurality of paper trays on the basis of a kind of the information recorded on a recorded paper.

In accordance with the device thus configured, the receiver receives plural kinds of information to be recorded. The recording device records the information received by the receiving unit onto a paper. The switching device switches paper delivery paths from the recording unit to one of the plurality of paper trays on the basis of the kind of the information recorded on the recorded paper. Therefore, the recorded papers can be distributed to different paper trays and a user can easily discriminate recorded papers of different information.

The information recording device may further include a judging device which judges the kind of the information received by the receiver and outputting a judgment signal, and the switching device may switch the paper delivery path in accordance with the judgment signal. The switching device may include a paper guide mechanism for selectively guiding the recorded paper from the recording device to one of the paper trays.

The information recording device may further include a shifting device for shifting a delivery position of the recorded paper on a single paper tray in a direction normal to a delivery direction of the recorded paper. The shifting device may include a paper delivery roller mechanism through which the recorded paper is delivered onto the paper tray, the mechanism being movable in the direction normal to the delivery direction.

According to still another aspect of the present invention, there is provided an information recording device including: a receiver which receives plural kinds of information to be recorded; a judging device which judges a kind of the information received by the receiver; a recording device which records the information received by the receiver onto a paper; a plurality of paper trays; and a delivering device which selectively delivers a recorded paper on which the information is recorded by the recording device to one of the plurality of paper trays on the basis of the kind of the information recorded on the recorded paper which is judged by the judging device.

In accordance with the device thus constructed, the receiver receives plural kinds of information to be recorded on paper or the like. The judging device judges the kind of the information received by the receiver and outputs a judgment signal based on the judgment result. The recording device records the information received by the receiver onto a paper. The delivering device delivers a recorded paper on which the information is recorded by the recording device to one of the plurality of paper trays on the basis of the kind of the information recorded on the recorded paper. Therefore, the recorded papers are distributed to different paper trays according to the kind of the information recorded thereon, and a user can easily discriminate recorded papers of different information.

The information may include a first kind of information which is derived from a first source, a second kind of information which is derived from a second source and a third kind of information which is derived from a third source, and the delivering device may deliver the recorded paper of the first information to a first paper tray, deliver the recorded paper of the second information to a first position of a second paper tray, and deliver the recorded paper of the third information to a second position of the second paper tray. The second position is different from the first position. The first source may be a communication unit, the second source may be an information processing unit and the third means may be an information reading unit.

The delivering device may selectively deliver the recorded paper to one of the plurality of paper trays on the basis of an information source from which the information recorded is derived. Further, the delivering device may deliver the recorded paper on which the information derived from a communication unit is recorded to a first one of the plurality of paper trays, and delivers the recorded paper on which the information derived from other information sources is recorded to one of the plurality of paper trays other than the first one.

The delivering device may deliver the recorded paper of the different information derived from other information sources is recorded to different positions on the one of the plurality of paper trays other than the first one in accordance with a judgment signal output from the judging device.

The information derived from other information sources may include information from an information processing unit and information from an information reading unit. The information recording device may further include an original paper receiver, and the delivering device may deliver an original paper to the original paper receiver.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings. It is noted that the embodiments described below are directed to a case where the present invention is applied to a multi-function type information recording device which employs a printer function, a facsimile function and a copy function.

[I] Configuration of Multi-Function Type Information Recording Device

First of all, the whole configuration of the multi-function type information recording device according to the embodiment of the invention will be described with reference to FIG. 1.

Figure 1:
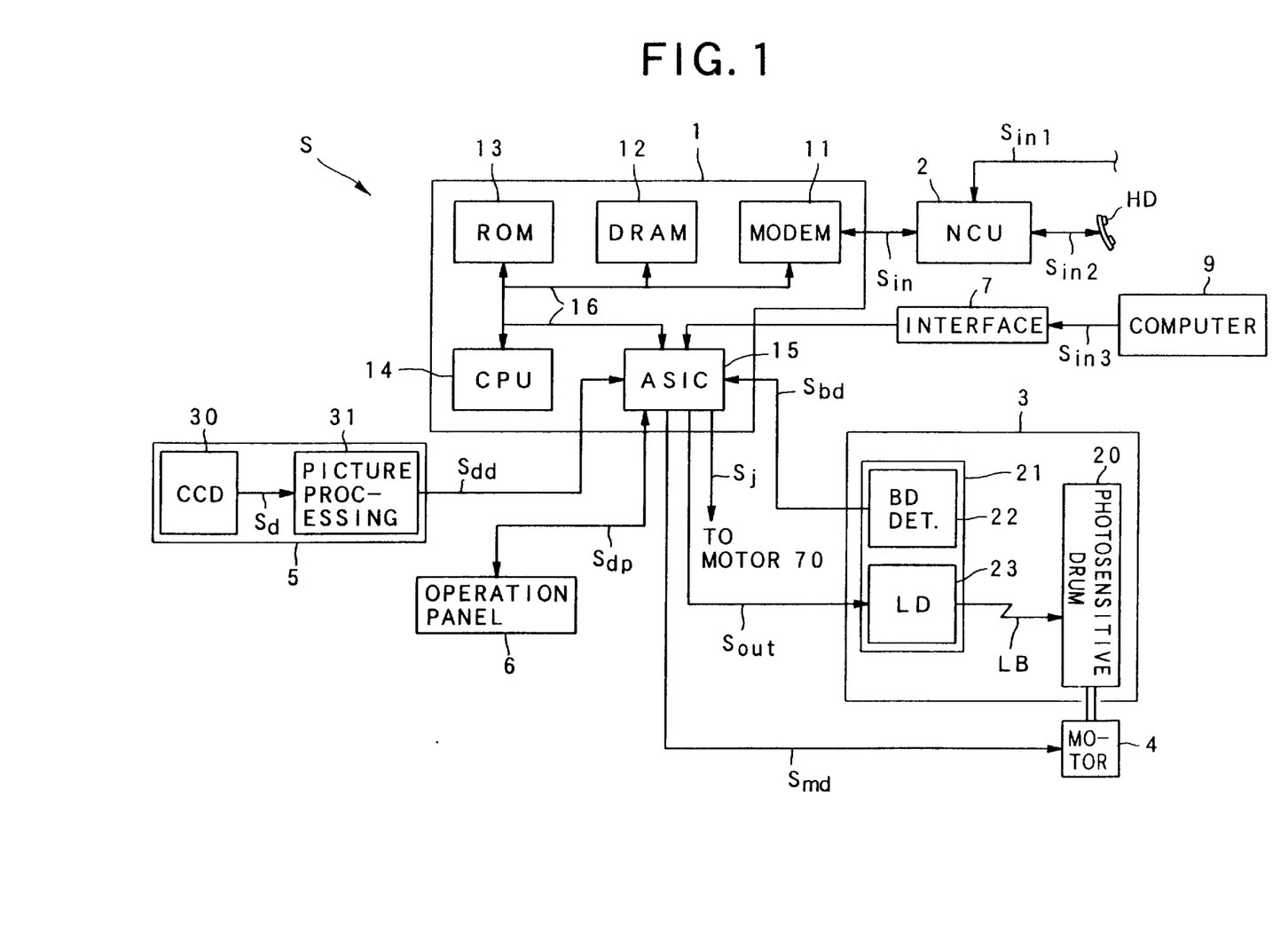
FIG. 1 is a block diagram schematically illustrating a configuration of an information recording device according to the present invention.

As shown in FIG. 1, the information recording device S according to the embodiment is provided with a body unit 1, a Network Control Unit (NCU) 2, a laser recording engine 3, a motor 4, a reading unit 5, an operation panel 6 and an interface 7. The NCU 2 performs a control of transmission lines. The laser recording engine 3 includes a sensitized (photosensitive) drum 20, and emits a laser light LB to form an electrostatic latent image on the photosensitive drum 20 to perform a so-called gradation recording or binary recording. The motor 4 rotates the photosensitive drum 20 and other elements, and the reading unit 5 reads facsimile information to be transmitted and picture data to be printed on papers. The operation panel 6 receives inputs to the information recording device S and displays the operational condition of the recording devices. The interface 7 receives print information $S_{in3}$ supplied from an external computer 9 and the like.

Further, the NCU 2 supplies, as information to be recorded by the information recording device S, facsimile information $S_{in1}$ received from the telephone line to a modem 11 in the body unit 1 as an input signal $S_{in}$. The NCU 2 also supplies audio information $S_{in2}$ to an accessory handset HD. Furthermore, the NCU 2 transmits facsimile information $S_{in1}$ and audio information $S_{in2}$ from the telephone handset HD out to the telephone line.

The body unit 1 includes a modem 11, a Dynamic Random Access Memory (DRAM) 12, a Read Only Memory (ROM) 13, a CPU 14, an Application Specific Integrated Circuit (ASIC) 15 and a bus 16.

With this configuration of the body unit 1, the modem 11 carries out modulation and demodulation. More specifically, the modem 11 demodulates the input signal $S_{in}$ to output a corresponding digital signal to the bus 16, and modulates data (facsimile information $S_{in1}$) from the bus 16 to output it to the NCU 2.

The DRAM 12 temporarily stores necessary data under the control via the bus 16 of the CPU 14. Specifically, the DRAM 12 temporarily stores data inputted from the telephone line as facsimile information $S_{in1}$, data to be transmitted out to the external telephone line and picture data inputted by the reading unit 5, and outputs respective data at appropriate timings under the control of the CPU 14, according to needs.

The ROM 13 is a read-only memory which stores control programs for information recording processing mainly performed by the CPU 14, and outputs necessary data to the bus 16 under the control of the CPU 14.

The CPU 14 controls the overall performance of the information recording device S in accordance with the control programs stored in the ROM 13, and outputs various control signals to the ASIC 15 to control it. Further, the CPU 14 discriminates data inputted to the information recording device S from facsimile information $S_{in1}$, print information $S_{in3}$ and copy information internally produced, and outputs a judgment signal $S_j$ to a motor 70 described later.

The ASIC 15 is a single chip semiconductor integrated circuit including various control units. By way of example, the ASIC 15 includes a recording control unit for outputting an output signal $S_{out}$ to drive the laser recording engine 3 based on the control signal from the CPU 14, a reception control unit for receiving data (print information $S_{in3}$) from the external computer 9 via the interface 7, and a reading control unit for supplying picture data $S_{dd}$ inputted from the reading unit 5 to the recording control unit or to the DRAM 12. The ASIC 15 further includes a panel control unit for controlling the operation panel 6, and a Direct Memory Access (DMA) controller which transmits various data from the respective control units to DRAM 12 and from DRAM 12 to the control units.

The recording control unit converts, based on the control signal from the CPU 14, the picture data $S_{dd}$ inputted by the reading unit 5, or gradation or binary data corresponding to information to be recorded and supplied from the DRAM 12 via the BUS 16, and outputs the output signal $S_{out}$ to the laser recording engine 3. The output signal $S_{out}$ also functions to drive a laser diode 23 described later to perform the gradation recording or binary recording. A drive control unit in the ASIC 15 outputs a drive signal $S_{md}$ of the motor 4 to drive the photosensitive drum 20 and the like described later, on the basis of the control signal from the CPU 14. The motor 4 rotationally drives the photosensitive drum 20 based on the drive signal $S_{md}$.

Further, under the control of the CPU 14, the panel control unit in the ASIC 15 outputs a display signal $S_{dp}$ for displaying various operating conditions on the operation panel 6, and allows the operation panel 6 to output an operation signal to the CPU 14 via the bus 16 so that manipulations of buttons on the operation unit 6 results in the execution of the corresponding operation.

The laser recording engine 3 includes a scanner unit 21, including a beam Detector (BD) detecting circuit 22 and a laser diode 23, and the photosensitive drum 20.

The laser diode 23 emits the laser light LB to form electrostatic latent images on the photosensitive drum 20, on the basis of the output signal $S_{out}$ from the ASIC 15. The laser light LB forms electrostatic latent images corresponding to information to be recorded by single scan line unit while scanning the photosensitive surface of the photosensitive drum 20 in a direction parallel to the rotational axis of the photosensitive drum 20. At this moment, the drive signal $S_{md}$ is outputted from the recording control unit in the ASIC 15 to drive the motor 4 such that the photosensitive drum 20 makes a rotation for an angle corresponding to one scan line around the rotational axis every time when the laser light LB completes scanning for one scan line. By the scanning by the laser light LB (main scan) and the rotation of the photosensitive drum 20 (sub scan), the photosensitive drum 20 is formed with the electrostatic latent images corresponding a sheet of information to be recorded on a paper.

With respect to the positioning of the laser light LB, a timer (not shown) in the ASIC 15 counts a scanning time from the beginning of that scan line for every scan lines (specifically, the number of reference clocks each having a predetermined period is counted), and the irradiation position of the laser light LB is recognized by the ASIC 15 (recording control unit) by referring to the scanning time thus counted. By this, the irradiation position of the laser light LB may be detected and determined. For this purpose, the laser recording engine 3 is provided with the BD (not shown) at a position which is on the extension of the scan line of the laser light LB but is other than the position of the photosensitive drum 20, so that the laser light LB is incident upon the BD just before scanning the scan line at every scanning period, thereby setting the scanning range by the laser light LB. The BD detecting circuit 22 detects the incident timing of the laser light LB on the BD at every scanning periods to output a detection signal $S_{bd}$ to the ASIC 15. The ASIC 15 resets the timer in response to the reception of the detection signal $S_{bd}$ in every scanning periods and calculates the scanning time from which the irradiation position of the laser light LB is detected.

The reading unit 5 includes a Charge Coupled Device (CCD) 30 and a picture processing unit 31. The CCD 30 reads pictures to be recorded by the information recording device S and outputs a read-out signal $S_d$. The picture processing unit 31 produces picture data $S_{dd}$ on the basis of the read-out signal $S_d$ outputted from the CCD 30, and outputs the picture data $S_{dd}$ via the reading control unit in the ASIC 15 to the DRAM 12 or the recording control unit. The picture processing unit 31 determines whether the pictures in the picture data $S_{dd}$ is to be recorded by the gradation recording or by the binary recording, under the control of the CPU 14 responding to the manipulation of the operation panel 6. In the case of gradation recording, gradation data is supplied to the DRAM 12 or the recording control unit as the picture data $S_{dd}$. In the case of binary recording, binary data is supplied to the DRAM 12 or the recording control unit as the picture data $S_{dd}$.

In the case of performing the gradation recording using the print information $S_{in3}$ supplied from the external computer 9 via the interface 7, the gradation data inputted via the interface 7 is temporarily stored in the DRAM 12, and then outputted to the recording control unit via the bus 16. In the case of performing binary recording using the print information $S_{in3}$ supplied from the external computer 9 via the interface 7, the binary data inputted via the interface 7 is temporarily stored in the DRAM 12, and then outputted to the recording control unit via the bus 16.

The facsimile information $S_{in1}$ inputted via the telephone line is binary data which is processed by a binary data producing technique such as so-called dither method or error diffusion method, and gradation data is never inputted directly to the recording control unit as the facsimile information $S_{in1}$, even if the gradation recording is desired. Therefore, as to the facsimile information $S_{in1}$, binary data is temporarily stored in the DRAM 12 without exception, and then outputted to the recording control unit via the bus 16.

Figure 2:
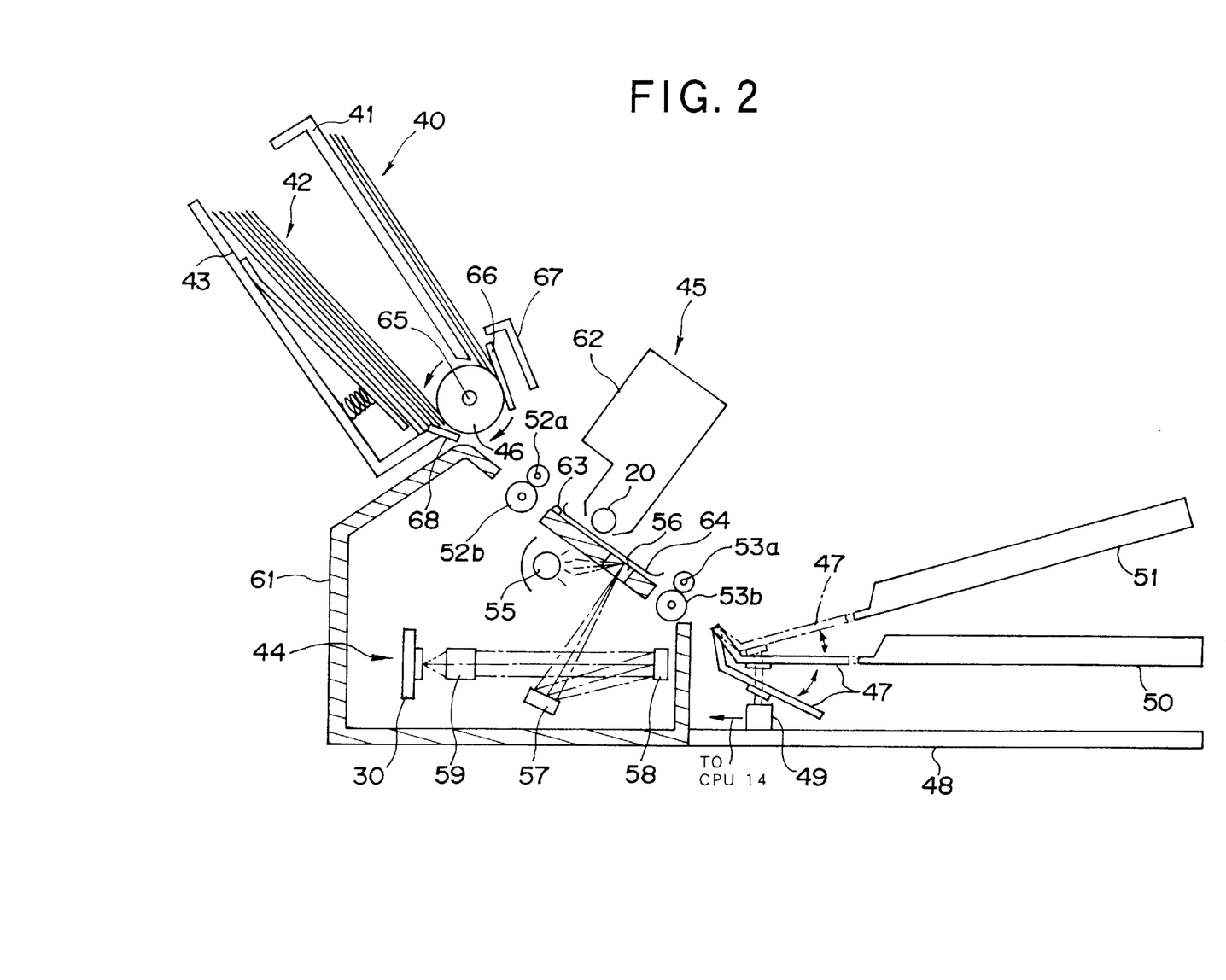
FIG. 2 is a schematic longitudinal sectional view of the information recording device according to the present invention.

Next, the specific configuration of the information recording device S will be described with reference to FIG. 2. FIG. 2 is a schematic longitudinal sectional view of the information recording device S according to the present invention, wherein the casing, the electronic circuit substrate and supporting members of the respective elements are omitted from the illustration, for the same of brevity. It is noted that FIG. 2 shows the performance as the facsimile function of the information recording device 2.

As shown in FIG. 2, the information recording device S includes an original paper holder 41, a recording paper holder 43, an information reading unit 44, a recording unit 45, a roller 46, a paper guide plate 47, an original paper tray (or stacker) 48 and recorded paper trays (or stackers) 50 and 51. The original paper holder 41 can hold a plurality of original papers 40 on which information to be transmitted by the facsimile function is recorded. The recording paper holder 43 can hold a plurality of recording papers 42 on which facsimile information $S_{in1}$ transmitted from external by the facsimile transmission is to be printed. The information reading unit 44 includes the CCD 30 shown in FIG. 1 and reads out information described on the original papers 40. The recording unit 45 includes the laser recording engine 3, and records the facsimile information $S_{in1}$ on the recording papers 42. The roller 46 is positioned between the exit of the original papers on the original paper holder 41 and the exit of the recording papers 42 on the recording paper holder 43, and the rotation direction thereof can be switched as shown in the arrows in FIG. 2. The roller 46 rotatable in both clock wise and counterclockwise directions rotates in the clockwise direction in FIG. 2 to draw the original papers 40 out of the original paper holder 41 one by one from the exit thereof, and rotates in the counterclockwise direction in FIG. 2 to draw the recording papers 42 out of the recording paper holder 43 one by one from the exit thereof. The original paper tray 48 can hold a plurality of original papers 40 from which information has been read out by the information reading unit 44. The paper guide plate 47 guides the original papers 40 after the reading by the information reading unit 44 to the original paper tray 48, and guides the recording papers 42 after the recording by the recording unit 45 to the recorded paper tray 50 or 51. The recorded paper trays 50 and 51 receive and hold the papers on which information is recorded by the recording unit 45.

With this configuration, when the information recording device S acts as a facsimile device which records the facsimile information $S_{in1}$ transmitted from external, the paper guide plate 47 is moved to align with the bottom surface of the recorded paper tray 50 by means of the solenoid 49 including electromagnetic coil, so that the papers 42 after the recording are delivered to the recorded paper tray 50. When information on the original papers 40 is read by the information reading unit 44 to transmit it to the external unit by the facsimile function, the paper guide plate 47 is moved to align with the bottom surface of the original paper tray 48 by means of the solenoid 49, so that the original papers 40 after being read delivered to the recorded paper tray 51. The solenoid 49 driving the paper guide plate 47 operates in response to the control signal $S_j$ from the CPU 14, and the operation by the CPU 14 will be described later. The recording unit 45 functions as a recording unit for recording the print information $S_{in3}$ and for recording copy information.

In addition to the components described above, the information recording device S includes a pair of paper feed rollers 52a and 52b, and a pair of paper delivery rollers 53a and 53b. The paper feed rollers 52a and 52b transfer the original papers 40 fed from the roller 46 to the information reading unit 44, and transfer the recording papers 42 to the recording unit 45. The paper delivery rollers 53a and 53b transfer the original papers 40 to the original paper tray 48 after the reading by the information reading unit 44, and transfer the recording papers 42 to the recorded paper trays 50 and 51 after the recording by the recording unit 45. The paper feed rollers 52a and 52b and the paper delivery rollers 53a and 53b are used in common between two delivery paths of the papers, i.e., the delivery path of the original papers 40 from the original paper holder 41 to the original paper tray 48, and the delivery path of the recording paper 42 from the recording paper holder 43 to the recorded paper tray 50 or 51.

Further, the information reading unit 44 is accommodated in the casing 61, and includes a light source 55 for emitting a laser light LB, a lens 59 and the CCD 30. The lens 59 collects the light which is emitted by the light source 55, transmitted through the glass plate 56 and then reflected by the original paper 40 and the mirrors 57 and 58. The CCD 30 receives the light collected by the lens 59 to output the read signal $S_d$ indicative of information described on the original paper 40.

The recording unit 45 includes a recording head 62 which includes the laser engine 3 having the photosensitive drum 20. The delivery paths of the original papers 40 and the recording papers 42 are arranged between the information reading unit 44 and the recording unit 45. The position of the recording onto the recording paper 42 by the recording unit 45 is located at the upstream (on the side of the original paper holder 41 or the recording paper holder 43) of the information reading position by the information reading unit 44 in the delivery path of the original papers 40 or the recording papers 42. Slightly upstream of the recording position by the recording unit 45, there is provided a paper detecting sensor 63 which detects the leading portion of the original papers 40 or the recording papers 42. Further, between the information reading unit 45 and the recording unit 44, there are provided presser plates 64 each having a predetermined length and arranged with a thin spacing to the surfaces of the casing 61 and the glass plate 56. The presser plate 64 has a cut-out covering the area used for the recording by the photosensitive drum 20. A pair of the presser plates 64 are arranged in alignment with each other and apart from each other by a given interval in the direction normal to the surface of FIG. 2, so as to prevent the original paper 40 or the recording paper 42 from popping up at the time of the reading by the information reading unit 44 or the recording by the recording unit 45.

Further, in close proximity of the roller 46 rotatable around the rotational axis 65, a pressing plate 66 for the original papers 40 and a pressing plate 68 for the recording papers 42 are arranged inside of a cover 67. The pressing plate 66 presses the original paper 40 against the roller 46 so that the original paper 40 is transferred to the paper feed rollers 52a and 52b one by one, and the pressing plate 68 presses the recording paper against the roller 46 so that the recording paper 42 is transferred to the paper feed rollers 52a and 52b one by one.

In addition to the facsimile function, the information recording device S configured as described above can function as a printer device which records print information $S_{in3}$ inputted from the external computer 9 onto the recording papers 42. In this case, information corresponding to the print information $S_{in3}$ is inputted to the recording unit 45 within the body unit 1 as the output signal $S_{out}$, and is recorded on the recording papers 42 transferred along the delivery path thereof. The recording papers 42 after the recording are delivered to the paper tray 51 by the operation of the paper guide plate 47 driven by the solenoid 49. On the other hand, when the information recording device S is used as a copy machine, information to be copied, described on the original papers 40, is read by the information reading, unit 44 and stored temporarily in the DRAM 12. After the original papers 40 are taken out to the original paper tray 48, the information to be copied is read out from the DRAM 12 to the recording unit 45, which records the read information onto the recording papers 42. The recording papers 42 thus recorded with the copy information are then delivered to the paper tray 51 by the operation of the paper guide plate 47. However, the recording papers 42 of the print information $S_{in3}$ and the recording papers 42 of the copy information are delivered and taken out to the different positions on the paper tray 51, respectively, by the operation of the delivery mechanism including the delivery rollers 53a and 53b. Specifically, those papers are delivered, respectively, to the positions shifted in the normal direction of the paper transfer direction in which the recording papers 42 are transferred onto the paper tray 51.

Figure 3:
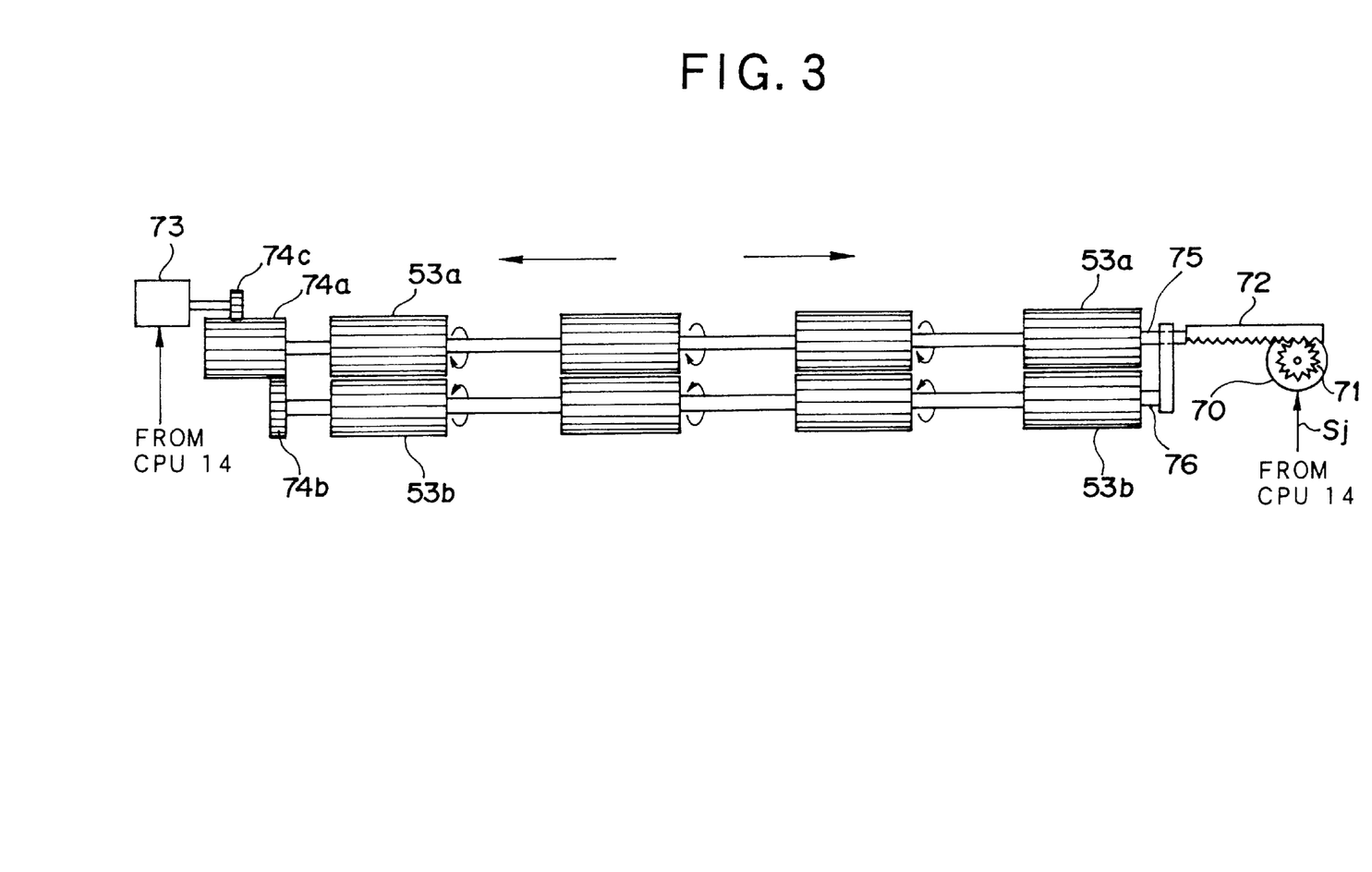
FIG. 3 is a front view of a paper delivery mechanism from a side of paper trays.
Figure 4:
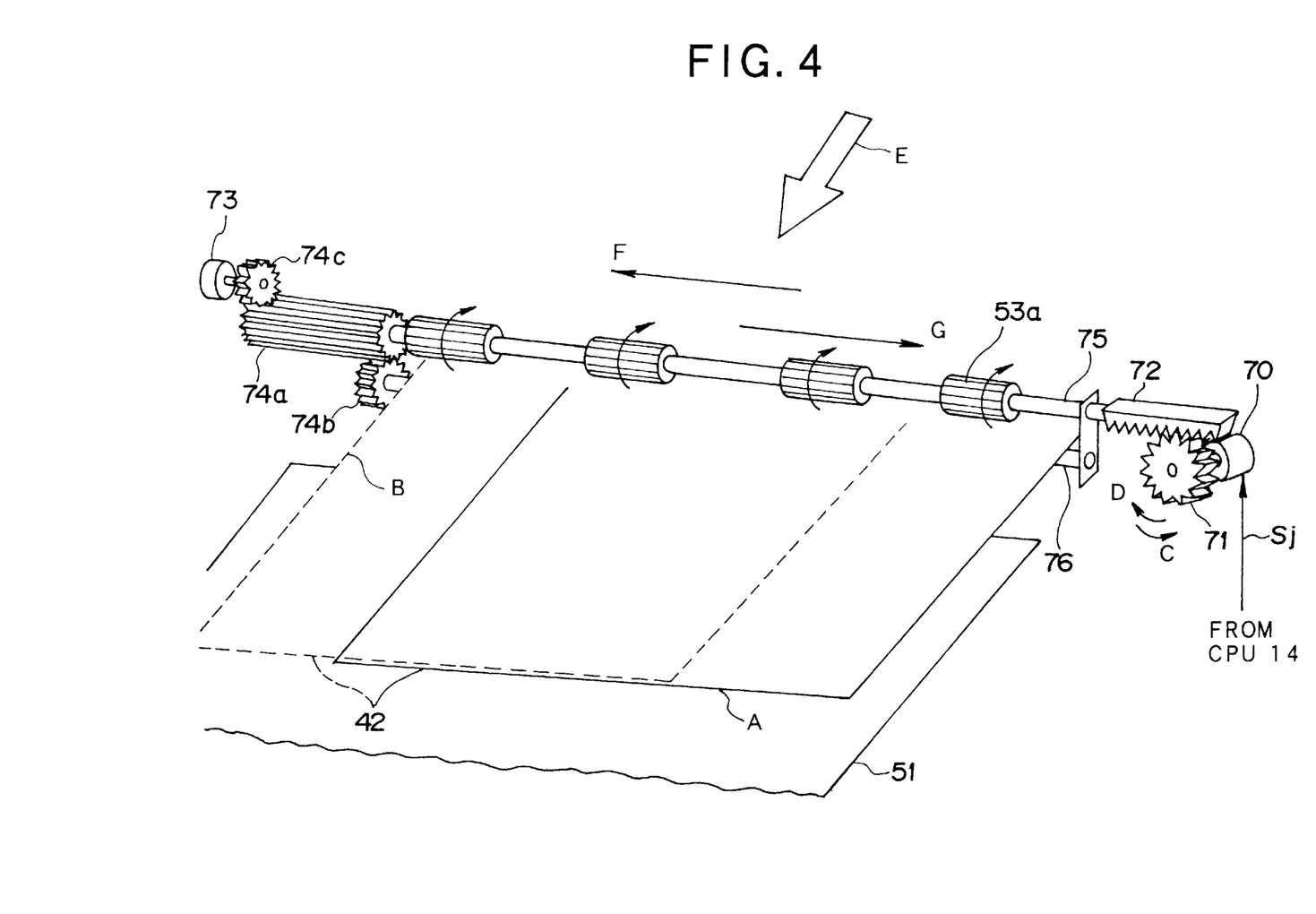
FIG. 4 is a perspective view of the paper delivery mechanism.

Next, the description will be given of the configuration and operation of the delivery mechanism including the delivery rollers 53a and 53b, by referring to FIGS. 3 and 4. FIG. 3 is a front view of the paper delivery mechanism from the side of the paper trays 50 or 51, and FIG. 4 is a perspective view of the paper delivery mechanism given for the purpose of explaining the operation of thereof.

As shown in FIG. 3, plural pairs of the delivery rollers 53a and 53b, made of rubber, are provided on the rotational shafts 75 and 76 extending in the direction normal to the paper transfer direction of the recording papers 42 and the original papers 40. Each delivery roller 53a is linked to the rack 72 and the motor 70 via the rotational shaft 75, and is rotated by the rotation of the rotational shaft 75 to,deliver the recording papers 42 and the original papers 40. At this moment, the rack 72 holds the rotational shaft 75 rotatably. Each delivery roller 53b is linked to the motor 73 and the rotational shaft 75 via the gears 74a, 74b and 74c, and delivers the recording papers 42 or the original papers 40 by the interlocked operation with the delivery roller 53a in response to the rotation of the motor 73 controlled by the CPU 14. The rotational direction of the delivery roller 53a is opposite to that of the delivery roller 53b, and the recording papers 42 or the original papers 40 are delivered though the gap of the delivery rollers 53a and 53b.

The rack 72, to which the delivery rollers 53a and 53b are interlocked, is arranged to engage with the gear 71 which rotates around the rotational axis of the motor 71, normal to the rotational shafts 75 and 76. The gear 71 is rotationally driven by the motor 70 which is controlled by the judgment signal $S_j$ supplied from the CPU 14.

Next, the operation of the paper delivery mechanism at the time of recording print information $S_{in3}$ and copy information will be described with reference to FIG. 4.

At the time of recording print information $S_{in3}$ and copy information by the information recording device S, the recorded papers 42 are delivered to the same paper tray 51. However, the recorded papers 42 on which print information $S_{in3}$ is recorded are delivered to the position B shifted in the normal direction to the paper delivery direction E (see. arrow in FIG. 4) from the position A at which the recorded papers 42 recorded with copy information are delivered. At this time, the paper delivery rollers 53a and 53b operate as follows. At the time of delivering the recorded paper of print information $S_{in3}$, first the CPU 14 sends the judgment signal $S_j$ instructing the motor 70 to start rotation in the direction C at the timing when the recording paper 42 makes contact with the paper delivery rollers 53a, and simultaneously instructs the motor 73 to start rotation. By this, the paper delivery rollers 53a and 53b are moved in the direction F while they are being rotated around the rotational shafts 75 and 76. Therefore, the recording paper 42 on which print information $S_{in3}$ is recorded is shifted to the direction F while being transferred in the delivery direction F, and finally delivered to the position B in FIG. 4. After the recorded paper 42 is delivered to the position B, the CPU 14 instructs the motor 70 to rotate in the reverse direction D to move the rotational shafts 75 and 76 with the paper delivery rollers 53a and 53 in the direction G until they return to their original positions. Thereafter, the paper delivery mechanism becomes a waiting status for the subsequent paper delivery. The above described operation is repeated until all contents of the print information $S_{in3}$ is recorded.

In contrast, at the time of delivering the recording paper 42 on which copy information is recorded, the CPU 14 gives the instruction only to the motor 73 to start rotation at the timing when the paper 42 makes contact with the paper delivery rollers 53a and 53b. Namely, the motor 70 is not rotated. The paper delivery rollers 53a and 53b rotate while the rotational shafts 75 and 76 stay at their original position, and the mechanism delivers the recorded papers 42 in the paper delivery direction E. As a result, the papers 42 on which copy information is recorded are delivered to the position A. The above operation is repeated until all copy information is recorded.

As described above, since the paper delivery rollers 53a and 53b are moved in the direction normal to the paper delivery direction E according to the kind of the papers (specifically the kinds of information recorded thereon), the papers 42 recorded with print information $S_{in3}$ are delivered to the position on the paper tray 51 different from the position where the papers 42 recorded with copy information are delivered.

Next, the control operation of the information recording device S will be described with reference to FIGS. 5 and 6.

[II] 1st Embodiment

First, the first embodiment of the operation of the information recording device S will be described with reference to the flowchart in FIG. 5. It is noted that, in the first embodiment shown in FIG. 5, the recorded papers 42 of facsimile information $S_{in1}$ are delivered to the paper tray 50, and the recorded papers 42 of print information $S_{in3}$ and copy information are delivered to the different positions on the paper tray 51.

In the first embodiment, first it is judged whether or not certain data is inputted (step S1). If No, the process keeps waiting status until data is inputted. If data is inputted (step S1: Yes), then it is judged whether or not the data thus inputted is facsimile information $S_{in1}$ (step S2). If Yes, the information recording device S determines to function as a facsimile. Namely, the CPU 14 controls the solenoid 49 to position the paper guide plate 47 to align with the paper tray 50 (step S3), and transfers facsimile information $S_{in1}$, for the amount of one page print from the DRAM 12 to the recording unit 45 (step S4). Then, the recording unit 45 records information thus received onto a sheet of recording paper 42 (step S5), and the paper delivery mechanism including the paper delivery rollers 53a and 53b delivers the recorded paper 42 to the paper tray 50 through the paper guide plate 47 (step S6). Thereafter, it is detected whether or not facsimile information $S_{in1}$ for other pages remains (step S7). If Yes, the process returns to step S4 to repeat the same process (steps S4 to S6) to record the remaining pages of the facsimile information $S_{in1}$. If there is no remaining facsimile information $S_{in1}$ (step S7: No), then the process ends.

If the data inputted is not facsimile data $S_{in1}$ (step S2: No), then the CPU 14 controls the solenoid 49 to move the paper guide plate 47 to align with the paper tray 51 (step S8). Then, it is judged whether or not the data inputted is print information $S_{in3}$ supplied from the external computer 9 (step S9). If the data inputted is print information $S_{in3}$ (step S9: Yes), the information recording device S determines to function as a printer. Namely, the CPU 14 transfers print information $S_{in3}$ for the amount of one page print from the DRAM 12 to the recording unit 45 (step S10). Then, the recording unit 45 records information thus received onto a sheet of recording paper 42 (step S11), and the paper delivery mechanism delivers the recorded paper 42 to the printer delivery position (position B in FIG. 4) on the paper tray 51 through the paper guide plate 47 (step S12). At this time, the paper delivery rollers 53a and 53b are rotated to deliver the recorded paper 42 while being shifted in the direction F (see. FIG. 4) parallel to the rotational shafts 75 and 76. Then, it is detected whether or not there is remaining the print information $S_{in3}$ for other pages (step S13). If Yes, the process returns to step S10 to repeat the same process (steps S10 to S12) to record the remaining pages of the print information $S_{in3}$. If there is no remaining print information $S_{in3}$ (step S13: No), then the process ends.

If the data inputted is not print information $S_{in3}$ (step S9: No), then the information recording device S recognizes that the data is copy information and determines to function as a copy machine. Namely, the CPU 14 transfers copy information for the amount of one page print from the DRAM 12 to the recording unit 45 (step S14). Then, the recording unit 45 records information thus received onto a sheet of recording paper 42 (step S15), and the paper delivery mechanism delivers the recorded paper 42 to the copy delivery position (position A in FIG. 4) on the paper tray 51 through the paper guide plate 47 (step S16). At this time, the paper delivery rollers 53a and 53b rotate to deliver the recorded paper 42 while staying at their original positions, i.e., without the movement in the direction F (see. FIG. 4). Then, it is detected whether or not there is remaining the copy information for other pages (step S17). If Yes, the process returns to step S14 to repeat the same process (steps S14 to S16) to record the remaining pages of the copy information. If there is no remaining copy information (step S17: No), then the process ends.

According to the operation of the first embodiment, the recorded papers 42 on which facsimile information $S_{in1}$ is recorded are delivered to the paper tray 50. The recorded papers 42 on which print information $S_{in3}$ is recorded are delivered to the printer position B on the paper tray 51, and the recorded papers 42 on which copy information is recorded are delivered to the copy delivery position A on the paper tray 51. Therefore, recorded papers recorded with different information are delivered to the different positions in an easily distinguishable and noticeable manner. Further, it is not necessary provide paper trays for every types of recorded information. Namely, the number of the paper trays may be less than the number of the types of information to be recorded on the papers, and hence the information recording device S itself may be downsized and the space occupied by the device may be saved.

Generally, the facsimile information is transmitted from various people at irregular times, and then printed on papers and delivered out from the recording device while the addressee does not know the reception. On the contrary, the print information or copy information is supplied to the recording device when the user wants to print them. Therefore, if the recorded papers of the facsimile information are delivered to the same paper tray as the recorded papers of the print information or the copy information, the recorded paper of the facsimile information, transmitted at irregular times, may be mixed with the recorded papers of the print or the copy information, thereby resulting in the missing of the recorded papers of the facsimile papers.

In the first embodiment, the recorded papers of the facsimile information are delivered to the paper tray other than the paper tray for the recorded papers of the print information and the copy information. Namely, the recorded papers of the facsimile information, generally transmitted at irregular times, are delivered to the paper tray for exclusive use. Therefore, it is possible to prevent the recorded papers of the facsimile information from being mixed with the recorded papers of the print or copy information and lost. As a result, the addressee can safely receive the recorded paper of the facsimile information.

[III] 2nd Embodiment

Next, the second embodiment of the control operation of the information recording device S will be described with reference to the flowchart shown in FIG. 6. According to the operation of the first embodiment, the recorded papers 42 on which facsimile information $S_{in1}$ is recorded are delivered to the paper tray 50, the recorded papers 42 on which print information $S_{in3}$ is recorded are delivered to the printer position B on the paper tray 51, and the recorded papers 42 on which copy information is recorded are delivered to the copy delivery position A on the paper tray 51. In the second embodiment described below, the horizontal movement amount of the rotational shafts 75 and 76 with the paper delivery rollers 53a and 53b are switched between three steps so that the recorded papers 42 on which different types of information is recorded are delivered to the three different delivery positions on a single tray. In the following description, the steps identical to those shown in FIG. 5 are attached with the identical step numbers and the detailed description thereof will be omitted.

Figure 5:
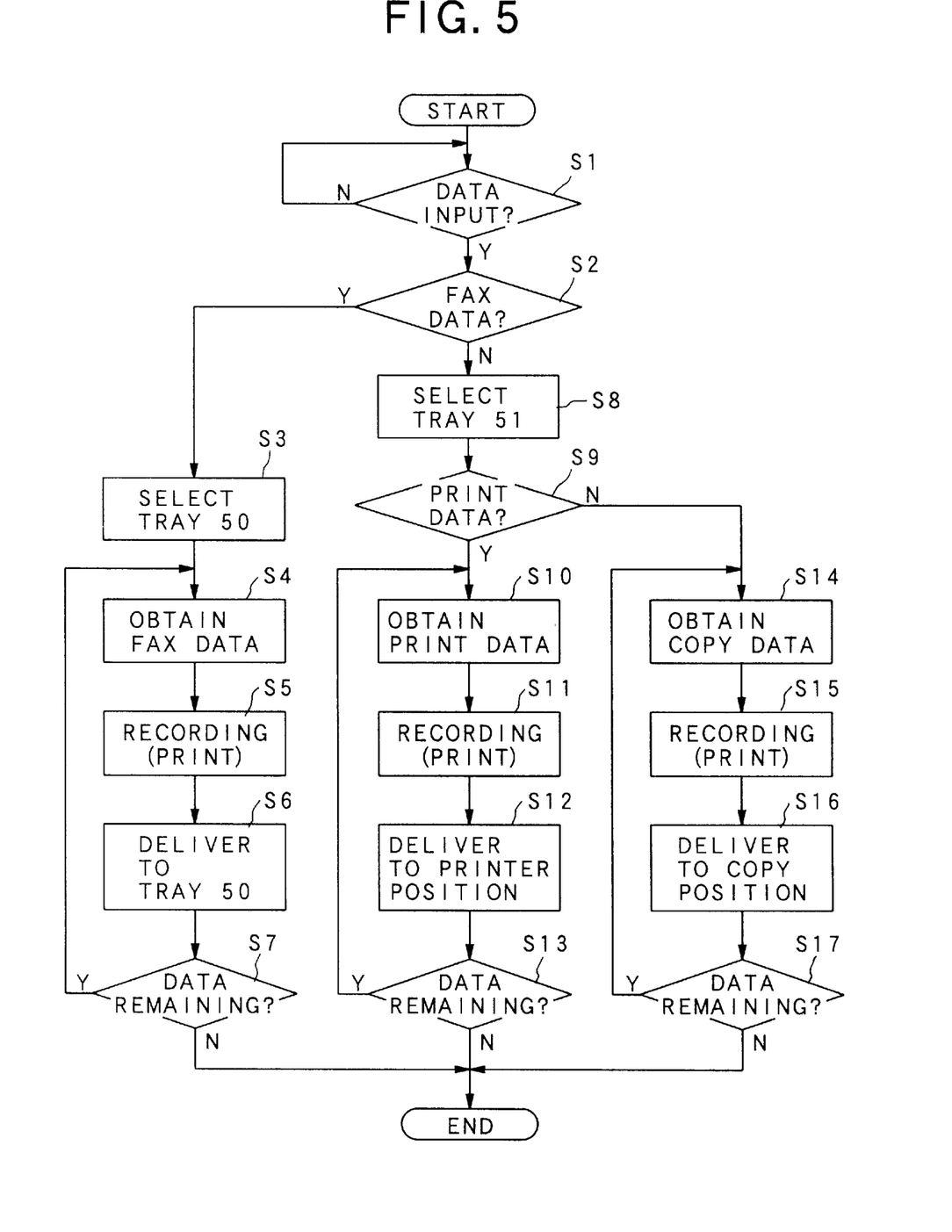
FIG. 5 is a flowchart illustrating control operation of the information recording device according to a first embodiment of the invention.
Figure 6:
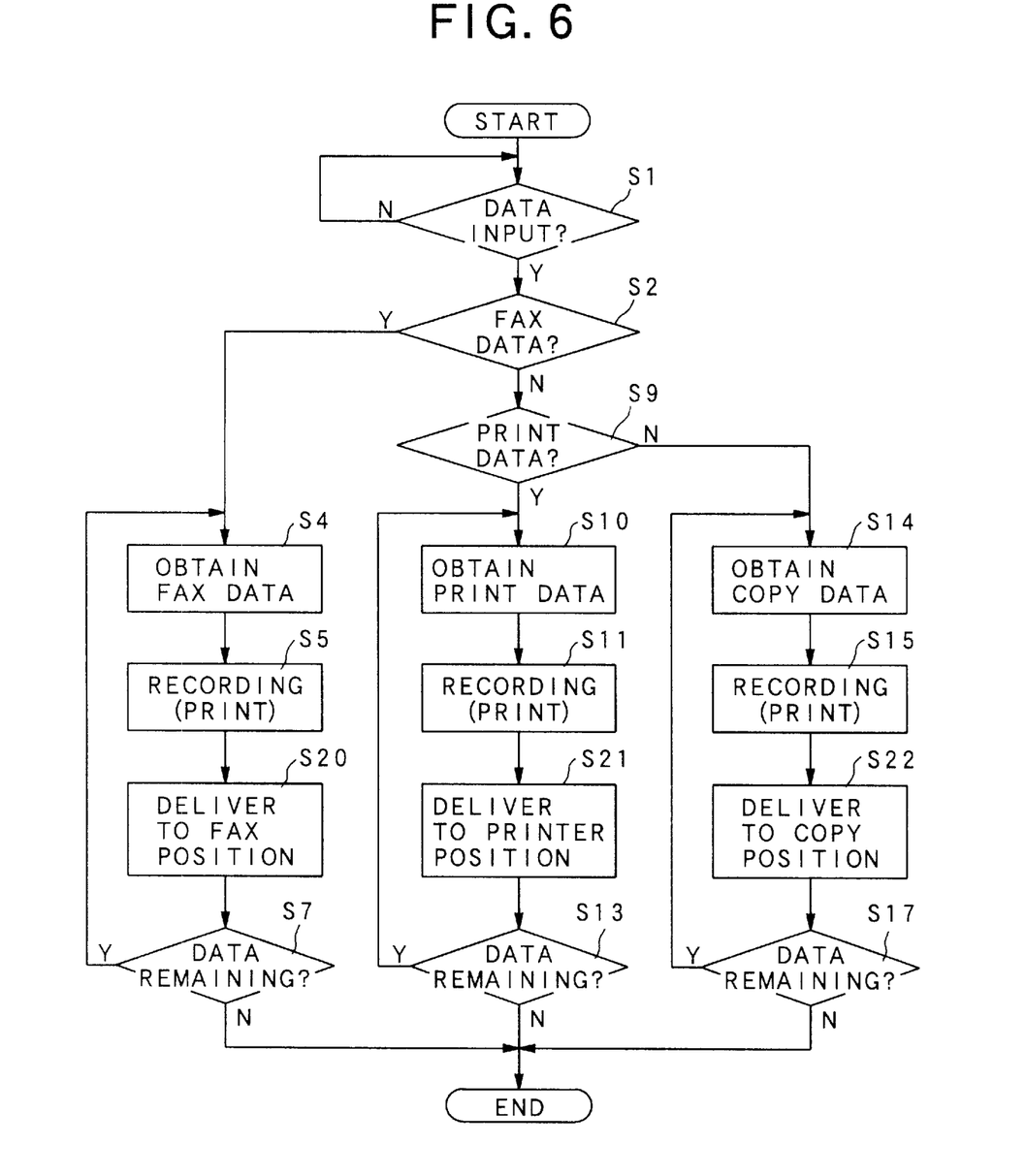
FIG. 6 is a flowchart illustrating control operation of the information recording device according to a second embodiment of the invention.

In the second embodiment, first the steps S1 and S2 identical to those in FIG. 5 are executed. At this moment, the paper guide plate 47 may be positioned in alignment with either one of the paper trays 50 or 51.

If it is judged that the data inputted is facsimile information $S_{in1}$ (step S2: Yes), the information recording device S determines to function as a facsimile device and executes steps S4 and S5. Then, the recorded papers 42 are delivered, by the delivery mechanism including the paper delivery rollers 53a and 53b and the paper guide plate 47, to the facsimile delivery position on either of the paper trays 50 or 51 (step S20). The facsimile delivery position may be on either one of the paper trays 50 or 51, and may be at a position other than the printer delivery position B in FIG. 4 and the copy delivery position A in FIG. 4. For example, the facsimile delivery position may be located further left side of the printer delivery position B. In that case, the horizontal movement amount of the rotational shafts 75 and 76 are larger than the movement amount for the printer delivery position B and the copy delivery position A. When the recorded paper 42 of the facsimile information $S_{in1}$ is delivered (step S20), then step S7 is executed. Thus, after all information is recorded on the papers, the process ends.

If the data inputted is not facsimile information $S_{in1}$ (step S2: No), then the CPU 14 judges whether or not the inputted data is print information $S_{in3}$ supplied from an external computer 9 (step S9). If the data is print information (step S9: Yes), the information recording device S functions as a printer. Namely, the CPU 14 executes steps S10 and S11 which are identical to those in FIG. 4, and then the recorded papers 42 are delivered, by the delivery mechanism, to the printer delivery position B on either of the paper trays 50 or 51 (step S21). When the recorded paper 42 of the print information $S_{in3}$ is delivered (step S21), then step S13 is executed. Thus, after all information is recorded on the papers, the process ends.

If the data inputted is not print information $S_{in3}$ (step S9: No), the data is judged to be copy information. Therefore, the information recording device S functions as a copy machine. Namely, the CPU 14 executes steps S14 and S15 which are identical to those in FIG. 4, and then the recorded papers 42 are delivered, by the delivery mechanism, to the copy delivery position A on either of the paper trays 50 or 51 (step S22). When the recorded paper 42 of the copy information is delivered (step S22), then step S17 is executed. Thus, after all information is recorded on the papers, the process ends.

According to the second embodiment described above, the recorded paper 42 of facsimile information is delivered to the facsimile delivery position, the recorded paper 42 of print information is delivered to the printer delivery position B, and the recorded paper 42 of copy information is delivered to the copy delivery position. Therefore, recorded papers of different information are delivered in an easily distinguishable and noticeable manner. Further, since recorded papers of all kind of information are delivered on a single paper tray, it is not necessary provide plural paper trays. Hence, the information recording device S itself may be further downsized and the space occupied by the device may be saved.

The above described embodiments are directed to an example of an information recording device S which has the functions of a facsimile, a printer and a copy machine. However, the application of the present invention is not limited to this feature. Namely, the present invention is broadly applicable to a device which records many types of information on papers of the same type and delivers the recorded papers to different positions according to the types of information recorded on the papers.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

What is claimed is:

1. An information recording apparatus comprising:
    a receiver for receiving three kinds of information to be recorded;
    a recording device for recording the information received by the receiver onto a paper;
    a first paper tray and a second paper tray;
    a paper output device for delivering the paper on which the information of a first kind is recorded to the first paper tray, and for delivering the paper on which the information of a second kind and of a third kind is recorded to the second paper tray, the paper output device delivering the paper to the second paper tray such that the paper on which the information of the second kind is recorded is distinguished from the paper on which the information of the third kind is recorded.

2. An apparatus according to claim 1, wherein the information of the first kind comprises facsimile information.

3. An apparatus according to claim 1, wherein the paper output device delivers the paper on which the information of the second kind is recorded to a first position on the second paper tray and delivers the paper on which the information of the third kind is recorded to a second position of the second paper tray, the second position being different from the first position.

4. An apparatus according to claim 3, wherein the paper output device comprises a mechanism for shifting the papers delivered on the second paper tray in a direction which is normal to the delivery direction of the papers.

5. An information recording apparatus comprising:
    a receiver for receiving plural kinds of information to be recorded;
    a recording device for recording the information received by the receiver onto a paper;
    a plurality of paper trays for outputting papers on which the information is recorded, the plurality of paper trays including at least one paper tray for outputting the paper on which only the information supplied from a first information source is recorded, and at least one additional paper tray for outputting the papers on which the information supplied from a plurality of information sources other than the first information source is recorded, the papers being output to the at least one additional paper tray in a manner such that the papers are distinguished from each other in terms of the information source.

6. An apparatus according to claim 5, wherein the first information source comprises a facsimile.

7. An apparatus according to claim 5, wherein the at least one additional paper tray delivers the paper on which the information supplied from a second information source is recorded to a first position and delivers the paper on which the information supplied from a third information source is recorded to a second position which is different from the first position.

8. An apparatus according to claim 7, wherein the at least one additional paper tray comprises a mechanism for shifting the papers in a direction which is normal to the delivery direction of the papers.

9. An apparatus according to claim 5, further comprising a shifting device for shifting a delivery position of the paper on the at least one additional paper tray in a direction normal to a delivery direction of the paper.

10. An apparatus according to claim 9, wherein said shifting device comprises a paper delivery roller mechanism through which the paper is delivered onto the at least one additional paper tray, said mechanism being movable in the direction normal to the delivery direction.

11. An apparatus according to claim 5, further comprising a tray for outputting an original paper.

* * * * *